(12) United States Patent
Rittman et al.

(10) Patent No.: US 11,586,799 B1
(45) Date of Patent: Feb. 21, 2023

(54) SYSTEMS AND METHODS OF ELIMINATING CONNECTIVITY MISMATCHES IN A MASK LAYOUT BLOCK

(71) Applicant: GBT Technologies Inc., Santa Monica, CA (US)

(72) Inventors: Danny Rittman, Oceanside, CA (US); Mo Jacob, Beverly Hills, CA (US)

(73) Assignee: GBT Technologies, Inc., Santa Monica, CA (US)

( * ) Notice: Subject to any disclaimer, the term of this patent is extended or adjusted under 35 U.S.C. 154(b) by 0 days.

(21) Appl. No.: 17/880,055

(22) Filed: Aug. 3, 2022

Related U.S. Application Data

(60) Provisional application No. 63/248,550, filed on Sep. 27, 2021.

(51) Int. Cl.
*G06F 30/39* (2020.01)
*G06F 30/398* (2020.01)
*G06F 30/392* (2020.01)
*G06F 111/04* (2020.01)
*G06F 119/02* (2020.01)

(52) U.S. Cl.
CPC .......... *G06F 30/398* (2020.01); *G06F 30/392* (2020.01); *G06F 2111/04* (2020.01); *G06F 2119/02* (2020.01)

(58) Field of Classification Search
CPC .. G06F 30/398; G06F 30/392; G06F 2111/04; G06F 2119/02
USPC ........................................................ 716/112
See application file for complete search history.

(56) References Cited

U.S. PATENT DOCUMENTS

| 5,541,025 | A  | 7/1996 | Oi et al.       |
|-----------|----|--------|-----------------|
| 5,761,075 | A  | 6/1998 | Oi et al.       |
| 6,457,163 | B1 | 9/2002 | Yang            |
| 6,782,517 | B2 | 8/2004 | Rittman et al.  |
| 6,782,524 | B2 | 8/2004 | Rittman         |
| 6,904,582 | B1 | 6/2005 | Rittman et al.  |

(Continued)

OTHER PUBLICATIONS

U.S. Appl. No. 17/315,747, Rittman et al.
U.S. Appl. No. 17/391,292, Rittman et al.

*Primary Examiner* — Paul Dinh
(74) *Attorney, Agent, or Firm* — Eric L. Lane; Green Patent Law

(57) ABSTRACT

Computer-implemented systems and methods for automatically eliminating connectivity mismatches in a mask layout block are provided. The disclosed systems and methods maintain the process design rules (DRC Clean), connectivity (LVS Clean) correctness, and obey Reliability Verification (RV) and DFM (Design for Manufacturability) constraints. Disclosed systems and methods analyze a physical connection of a selected polygon or net in a mask layout block and obtain connectivity information associated with the selected polygon or net from a netlist or external constraints file. The physical connection of the selected polygon or net is compared with the obtained connectivity information to determine whether there is a connectivity mismatch associated with the selected polygon or net. If there is a determined connectivity mismatch, a violation marker representing the connectivity mismatch is generated and the connectivity mismatch is corrected by placing, moving, or editing the selected polygon or net to modify the physical connection.

21 Claims, 11 Drawing Sheets

(56) References Cited

U.S. PATENT DOCUMENTS

| | | |
|---|---|---|
| 6,978,437 B1 | 12/2005 | Rittman et al. |
| 7,178,114 B2 | 2/2007 | Lin et al. |
| 7,519,940 B2 | 4/2009 | Huang et al. |
| 7,537,864 B2 | 5/2009 | Fujimoto et al. |
| 7,568,174 B2 | 7/2009 | Sezginer et al. |
| 7,600,212 B2 | 10/2009 | Zach et al. |
| 7,849,423 B1 | 12/2010 | Yenikaya et al. |
| 8,572,517 B2 | 10/2013 | Pramanik et al. |
| 8,940,462 B2 | 1/2015 | Hashimoto et al. |
| 9,292,627 B2 | 3/2016 | Pramanik et al. |
| 9,372,855 B1 | 6/2016 | Lee et al. |
| 9,836,556 B2 | 12/2017 | Lei et al. |
| 10,755,026 B1 | 8/2020 | Luo |
| 2002/0144230 A1 | 10/2002 | Rittman |
| 2002/0152453 A1 | 10/2002 | Rittman |
| 2002/0166109 A1 | 11/2002 | Rittman |
| 2005/0005256 A1 | 1/2005 | Rittman |
| 2005/0022151 A1 | 1/2005 | Rittman et al. |
| 2005/0142454 A1 | 6/2005 | Fujimoto et al. |
| 2007/0289207 A1* | 12/2007 | May .......... A01G 9/16 47/17 |
| 2008/0115102 A1* | 5/2008 | Rittman .......... G06F 30/39 716/55 |
| 2008/0134129 A1 | 6/2008 | Vickery |
| 2011/0229807 A1 | 9/2011 | Hashimoto et al. |
| 2021/0012054 A1* | 1/2021 | Adler .......... H05K 3/4038 |

* cited by examiner

SYSTEMS AND METHODS OF ELIMINATING CONNECTIVITY MISMATCHES IN A MASK LAYOUT BLOCK

CROSS-REFERENCE TO RELATED APPLICATION

This application is a non-provisional of and claims priority to U.S. Patent Application Ser. No. 63/248,550, filed Sep. 27, 2021, which is hereby incorporated by reference herein in its entirety.

FIELD

The present disclosure relates to the field of integrated circuits (ICs), and more particularly to systems and methods of automatic elimination of connectivity mismatches of a mask layout block in an IC layout database file, or a commercial layout editor environment using the editor's commands and functions, maintaining the process design rules (DRC Clean), layout connectivity (LVS Clean) correctness, obeying RV and DFM constraints.

BACKGROUND

Nanometer designs include millions of devices and operate at very high frequencies. To meet the challenges posed by such large-scale circuits, techniques have been developed to represent integrated circuit designs at various levels of abstraction. According to these techniques, an integrated circuit design may be represented by an electrical schematic containing devices and nets interconnecting the devices and by geometric layout data that describes patterns of regions or elements to be formed in and/or on an integrated circuit substrate, e.g., a wafer.

Techniques for managing highly integrated circuit designs include hierarchical design techniques. Using such techniques, a particular design is partitioned into functional cells and cells-within-cells, etc., so that at a given level of hierarchy the design may be analyzed as a set of cells and their respective interconnections, without being concerned with all the details of the contents of the cells, e.g., sub-cells within each cell.

These hierarchical techniques can be essential to the efficient performance of computer-assisted integrated circuit design verification. Such verification may include operations to perform layout versus schematic (LVS) comparison using computer-based design tools. As understood by those skilled in the art, tools to perform layout versus schematic comparison may include extraction software to extract a layout netlist from geometric layout data. An extracted layout netlist is then compared to an electrical schematic netlist to determine functional equivalence between the original integrated circuit schematic and the integrated circuit layout. One difficulty associated with the performance of these operations may be caused by dissimilarity in the labeling of nets and devices in the extracted layout netlist relative to the electrical schematic netlist.

A typical semiconductor design process includes many steps. Initially, a schematic diagram that represents an integrated circuit is prepared. The schematic diagram provides a representation of the logical connections between logic elements that form the integrated circuit. Once the schematic diagram has been tested to verify that the circuit performs the correct functions, the schematic diagram is converted into a mask layout block or database that includes a series of polygons. The polygons may represent the logic elements and the logical connections from the schematic diagram. The mask layout database is then used to form a series of photomasks, also known as masks or reticles, that may be used to manufacture the different layers of the integrated circuit.

Typically, the mask layout block or database is created manually by a mask designer or automatically by a synthesis tool. Once the mask layout database is complete, polygons that form electrical connections in the mask layout database are compared to the logical connections from the schematic diagram. This comparison may result in connection mismatches between the schematic diagram and the mask layout database. A connection mismatch typically indicates that an electrical connection in the mask layout database does not match its corresponding logical connection in the schematic diagram.

Today, any mismatches are corrected manually by a layout designer. The layout designer first must find the correct connection and then determine how to create the correct electrical connection in the mask layout database. Typically, the layout designer is required to delete the mismatched connection in the mask layout database and locate a path through existing polygons in the mask layout database. Once an appropriate path through the mask layout database is found, the layout designer creates a new electrical connection in the mask layout database that matches the corresponding logical connection in the schematic diagram.

This process of adding the new electrical connection may take several hours or days to complete. Furthermore, the layout designer may introduce design rule errors in the mask layout database when adding the new connection. Eliminating the design rule errors may additionally require several more hours or days and thus increase the design time for the integrated circuit.

Accordingly, there is a need for a system and method that automatically eliminates and corrects connectivity mismatches in mask layout blocks. There is also a need for a system and method that eliminates electrical connection mismatches ahead of time during the construction of mask layout blocks to provide significant time savings and massive reduction in the entire chip design cycle.

SUMMARY

The present disclosure, in its many embodiments, alleviates to a great extent the disadvantages and problems associated with correcting connectivity mismatches in a mask layout database file by providing systems and methods that automatically eliminate connectivity mismatches. Disclosed embodiments are able to maintain the process design rules (DRC Clean), layout connectivity (LVS Clean) correctness, obeying RV and DFM constraints, within an IC layout database file GDSII, GDS III (Oasis) or other formats, or using commercial layout editor commands and functions. Due to embodiments of the present disclosure, the disadvantages and problems associated with eliminating connectivity mismatches during construction of a mask layout block have been substantially reduced or eliminated.

As described in detail herein, disclosed embodiments include identifying a connectivity mismatch in the mask layout block or database and correcting the connectivity mismatch in the mask layout block database by analyzing a selected polygon(s) or net(s) in a mask layout block, obtaining connectivity information associated with the polygon from a netlist and/or external constraints file, and correcting the connectivity mismatch by placing, moving, or editing the selected polygon or net to modify the physical connection.

Exemplary systems and methods provide a violation marker associated with the selected position for the polygon or net that graphically represents the connectivity mismatch in the mask layout block where the selected polygon's position complies with the connectivity information. Exemplary embodiments include automatically preventing a polygon or net from being placed, created, or edited in a selected position in a mask layout block if a connectivity mismatch is identified.

In accordance with an exemplary embodiment, an automated method for eliminating connectivity mismatches in a mask layout file includes comparing a first connection in the mask layout block to a second connection in a schematic netlist. A connectivity mismatch is identified if the first connection does not match the second connection and the connectivity is automatically eliminated in the mask layout block.

In accordance with an exemplary embodiment, a computer system for eliminating connectivity mismatches in a mask layout block or database includes a processing resource coupled to a computer readable memory. Processing instructions are encoded in the computer readable memory. The instructions are executed by the processing resource to compare a first connection in a mask layout block to a second connection in a schematic netlist. The instructions further identify a connectivity mismatch in the mask layout block if the first connection does not match the second connection and automatically correct the connectivity mismatch in the mask layout block, maintaining the process design rules (DRC Clean), layout connectivity (LVS Clean) correctness, and obeying RV and DFM constraints.

Important technical advantages of disclosed embodiments include a connectivity comparison of layout versus schematic and automatic correction to reduces the design time for the overall integrated circuit design time. The tool checks a mask layout block for connectivity mismatches and identifies and represents any mismatches via a graphical representation called Advice Marker. In addition, the tool may be equipped with the option to show a fly-in that is connected between all correct layout nodes according to netlist and/or external constraints file.

If connectivity mismatches are identified, the tool automatically removes any mismatched connections and replaces the mismatched connections with electrical connections that match the corresponding logical connections in a schematic diagram or external constraints file. By eliminating connectivity mismatches in a mask layout block, the time needed for the final sign-off verification process for the mask layout block is substantially reduced.

Another important technical advantage of disclosed embodiments is a software tool that adds electrical connections to a mask layout database without introducing design rule errors. The tool finds paths in the mask layout database to add an electrical connection that matches the corresponding logical connection from a schematic diagram or external constraints file. When routing the electrical connection, the tool uses design rules for a specific manufacturing process and routes the electrical connection to avoid creating any design rule violations. The tool can work within any standard, commercial IC layout editor environment.

In accordance with another exemplary embodiment, a computer system for automatic elimination of connectivity mismatches of a mask layout block includes a processing resource coupled to a computer readable memory. Processing instructions are encoded in the computer readable memory. When the processing instructions are executed by the processing resource, the instructions analyze a selected polygon or net in a mask layout block and identify any connectivity mismatch in the mask layout block if the electrical connection does not correlates to corresponding netlist or external constraints file. If a connectivity mismatch is identified, the instructions prevent the polygon or net from being placed, created or edited at the selected position in the mask layout block.

An exemplary computer-implemented method of automatically eliminating connectivity mismatches in a mask layout block or database comprises analyzing a physical connection of a selected polygon or net in the mask layout block and obtaining connectivity information associated with the selected polygon or net from an external source. The physical connection of the selected polygon or net is compared with the obtained connectivity information to determine whether there is a connectivity mismatch associated with the selected polygon or net. If there is a determined connectivity mismatch a violation marker representing the connectivity mismatch is generated and the connectivity mismatch is corrected by placing, moving, or editing the selected polygon or net to modify the physical connection.

The external source may be a netlist or external constraints file. The methods may further comprise generating an LVS clean mask layout database during construction of the mask layout block. The methods may further comprise determining if the modified physical connection creates a process design rule violation, and if a process design rule violation is created, eliminating the process design rule violation by further modifying the modified physical connection. Exemplary methods further comprise providing an information window showing the connectivity information. The violation marker may also be viewable via the information window.

In exemplary embodiments, the analyzing step is performed during construction of the mask layout block. The step of correcting the connectivity mismatch may further comprise disconnecting the physical connection by erasing all net connections, locating correct layout nodes in the mask layout block, and creating a new physical connection between matched layout nodes. The methods may further comprise generating a fly-line marker representing a corrected position for the selected polygon or net. Exemplary methods may comprise preparing a correction dataset based on the determined connectivity mismatch and may include a feature for undoing a correction to the connectivity mismatch. In exemplary embodiments, the mask layout block includes at least one top-level cell and at least one sub-cell located in the top-level cell, and the methods further comprise determining if there is a connectivity mismatch in the at least one sub-cell. If there is a determined connectivity mismatch, further comprising preparing a correction dataset based on the determined connectivity mismatch.

An exemplary computer-implemented system for automatic elimination of connectivity mismatches in a mask layout block comprises a processor, and a computer readable memory in communication with the processor. The computer readable memory contains processing instructions providing for analysis of a physical connection of a selected polygon or net in the mask layout block and for retrieval of connectivity information associated with the selected polygon or net from an external source. The processing instructions may further provide for comparison of the physical connection of the selected polygon or net with the retrieved connectivity information to determine whether there is a connectivity mismatch associated with the selected polygon or net.

If there is a determined connectivity mismatch, the processing instructions provide for generation of a violation marker representing the connectivity mismatch and for correction of the connectivity mismatch by placing, moving, or editing the selected polygon or net to modify the physical connection. In exemplary embodiments, if there is a determined connectivity mismatch, the processing instructions prevent placement of the selected polygon or net in the mask layout block at a position that would create the connectivity mismatch. The processing instructions may also have the feature to read IC layout versus schematic run results and automatically correct connectivity mismatches of an IC layout database file GDSII, GDS III (Oasis) or other formats, or commercial layout editor environment using the editor's commands and functions, while maintaining the process design rules (DRC Clean), layout connectivity (LVS Clean) correctness, obeying RV and DFM constraints.

Exemplary systems further comprise an information window in communication with the computer readable memory and the processor. The connectivity information and the violation marker may be visible in the information window. In exemplary embodiments, a fly-line marker representing a corrected position for the selected polygon or net is visible in the information window. The mask layout block may include at least one top-level cell and at least one sub-cell located in the top-level cell, and the processing instructions may provide for determination whether there is a connectivity mismatch in the at least one sub-cell. In exemplary embodiments, the system further comprises a first set of neural networks trained with the connectivity information from the external source and a second set of neural networks trained with physical connections in the mask layout block. An expert system configured to automatically correct connectivity mismatches also may be provided.

An exemplary method for automatic elimination of connectivity mismatches in a mask layout block comprises analyzing a selected connection of a selected polygon or net in the mask layout block and determining if the selected connection of the selected polygon or net produces a connectivity mismatch in the mask layout block based on an external constraints file. If there is a determined connectivity mismatch, the methods include generating a violation marker representing the connectivity mismatch. Exemplary methods further comprise providing a fly-line between correct layout nodes and correcting the connectivity mismatch by placing, moving, or editing the selected polygon or net to modify the physical connection.

Correcting the connectivity mismatch comprises placing the selected polygon or net in an original position in the mask layout block. In exemplary embodiments, correcting the connectivity mismatch comprises adjusting the length and/or width of the selected polygon. Correcting the connectivity mismatch may comprise adjusting a number of contacts or VIAs of the net. If there is a determined connectivity mismatch, exemplary methods prevent placement of the selected polygon or net in the mask layout block at a position that would create the connectivity mismatch.

Accordingly, it is seen that systems and methods of correcting and eliminating connectivity mismatches are provided. These and other features of the disclosed embodiments will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure.

As used herein, the "present disclosure" refers to any one of the embodiments described herein, and any equivalents. Furthermore, reference to various aspects of the disclosure throughout this document does not mean that all claimed embodiments or methods must include the referenced aspects. Reference to materials, configurations, directions, and other parameters should be considered as representative and illustrative of the capabilities of exemplary embodiments, and embodiments can operate with a wide variety of such parameters. It should be noted that the figures may not show every piece of equipment, nor the materials, configurations, and directions of the various circuits and communications systems.

Exemplary embodiments include computer-implemented systems and methods for automatic elimination of connectivity mismatches in a mask layout block, maintaining the process design rules (DRC Clean), layout connectivity (LVS Clean) correctness, reliability verification (RV), and DFM constraints. As discussed in more detail herein, exemplary systems and methods use a processor and computer readable memory to operate and may include a layout editor interfaced tool. Disclosed embodiments analyze an integrated circuit layout block and identify connectivity mismatches. The methods include comparing a physical connection in a mask layout database to a corresponding connection in a schematic netlist and/or external constraints file. LVS problems are automatically corrected, including but not limited to, Shorts/Opens, Net Mismatches, and Well & Tap Shorts.

A connectivity mismatch is identified if the physical connection in the layout does not match the same connection in the schematics, netlist and/or external constraints file. If a connection does not match the connectivity information from the netlist or external constraints file, disclosed systems and methods automatically correct the connectivity mismatch in the mask layout data. The automatic correction maintains the integrated circuit mask layout process design rules (DRC Clean), layout connectivity (LVS Clean) correctness, reliability verification (RV), and DFM constraints.

Figure 1:
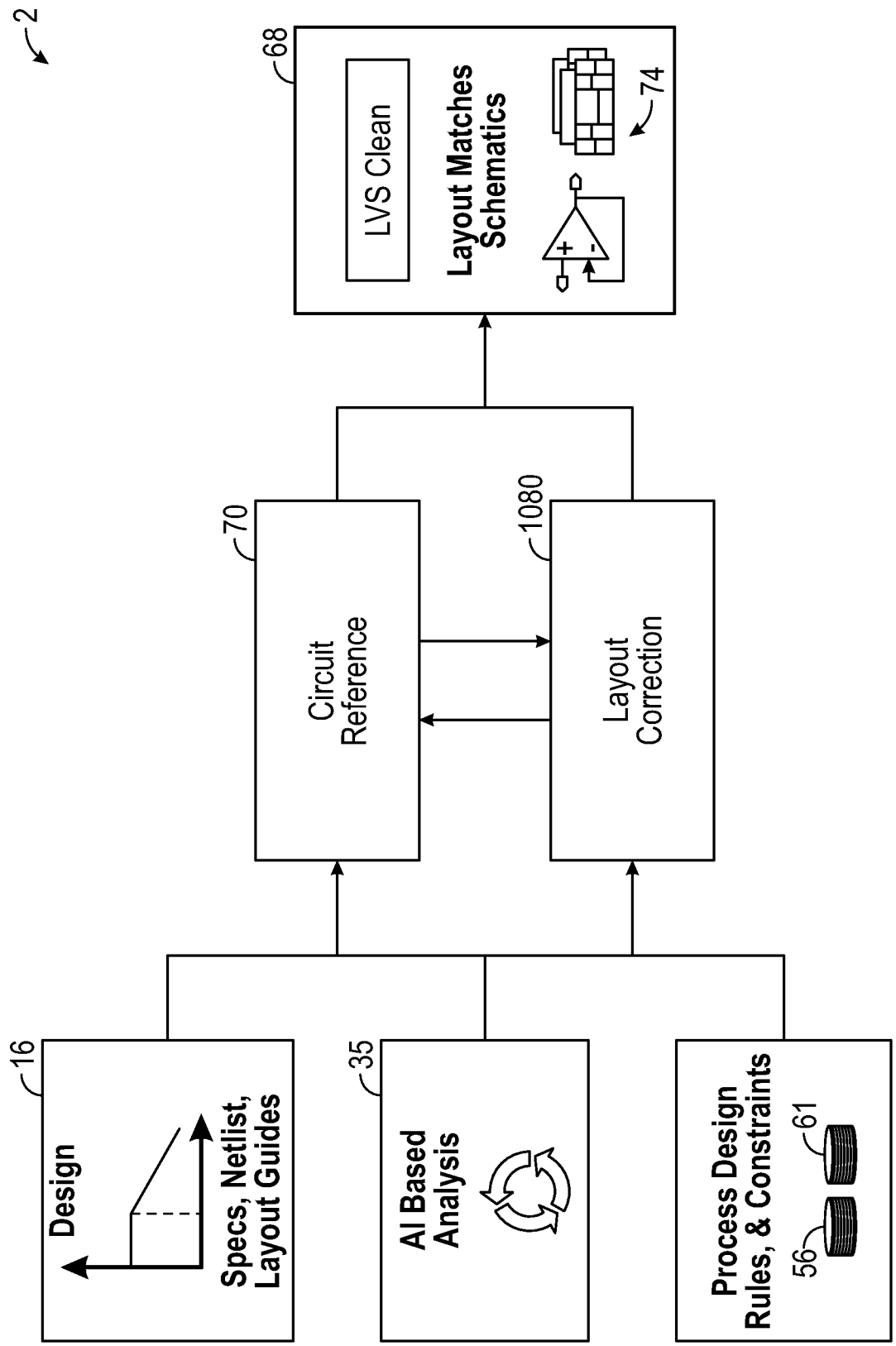
FIG. 1 is a flow chart of an exemplary system of eliminating connectivity mismatches in a mask layout block in accordance with the present disclosure.

Exemplary embodiments move and/or adjust mask layout polygons and/or their contacts or VIAs to correct connectivity mismatches. The systems and methods work on individual polygons and hierarchical assembly which may include top level block and sub-blocks. Referring to FIGS. 1-7, an exemplary computer-implemented method 1 of eliminating connectivity mismatches in a mask layout block 3 and corresponding system 2 will now be described. FIG. 1 shows a high-level system flow in which a netlist 16, constraints 56 and process design rules 61, along with analysis from an artificial intelligence unit 35, provide the inputs 52, and the circuit reference topology 70 informs mask layout block correction 1080, resulting in LVS clean 68 (layout connectivity) where the layout matches 74 the schematics.

Figure 1A:
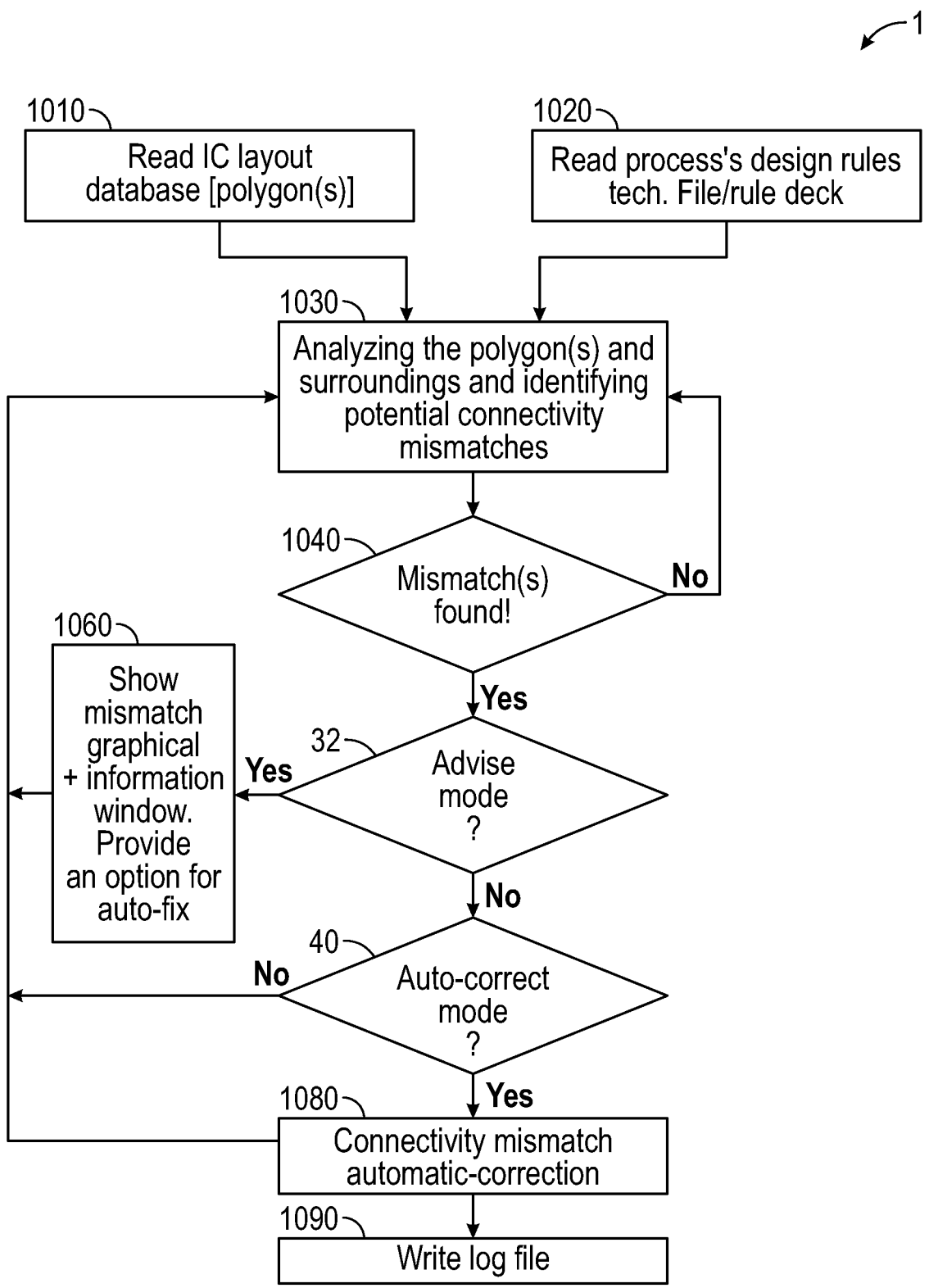
FIG. 1A is a flow chart of an exemplary method of eliminating connectivity mismatches in a mask layout block in accordance with the present disclosure.
Figure 1B:
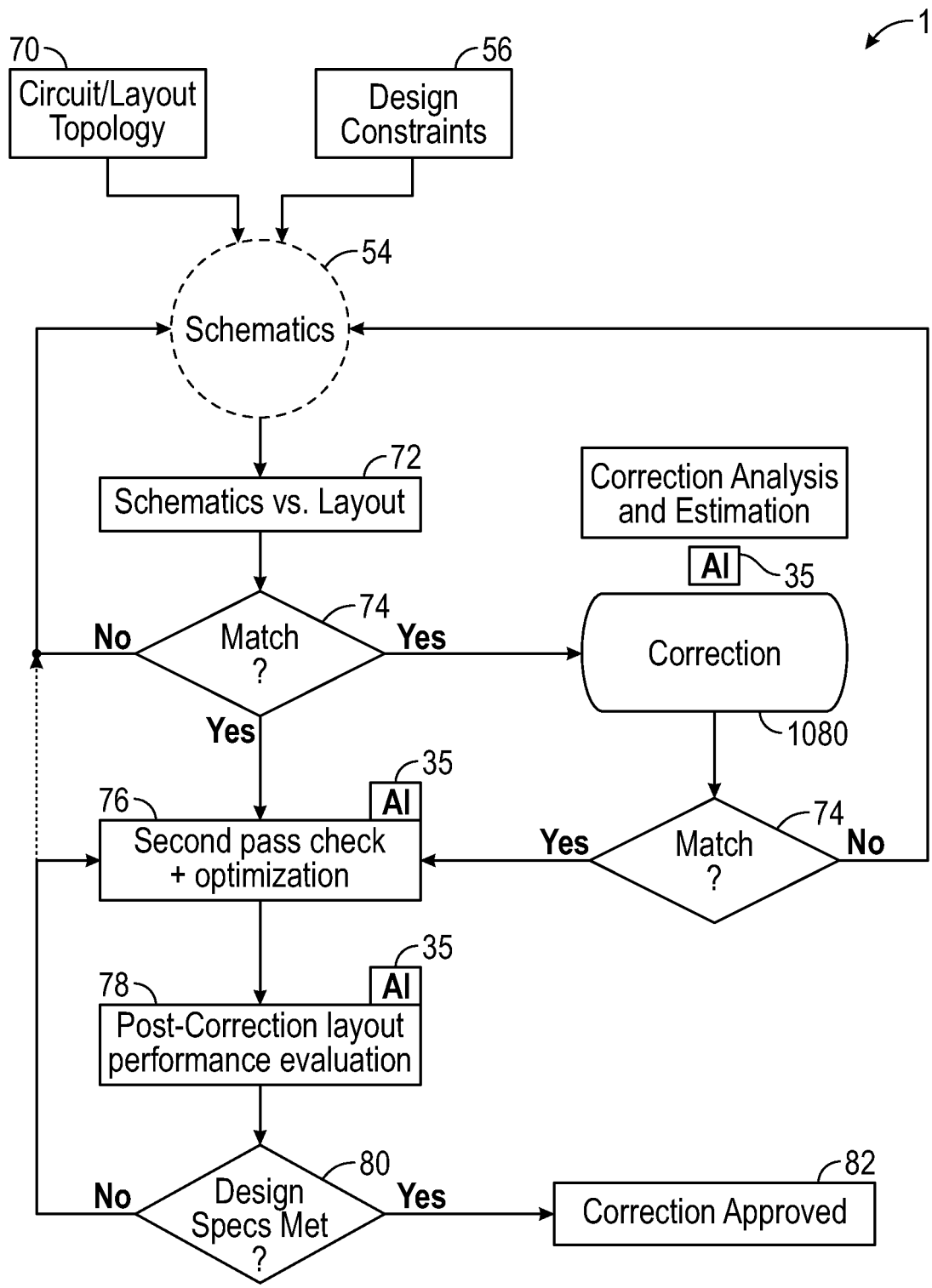
FIG. 1B is a flow chart of an exemplary method of eliminating connectivity mismatches in a mask layout block in accordance with the present disclosure.
Figure 1C:
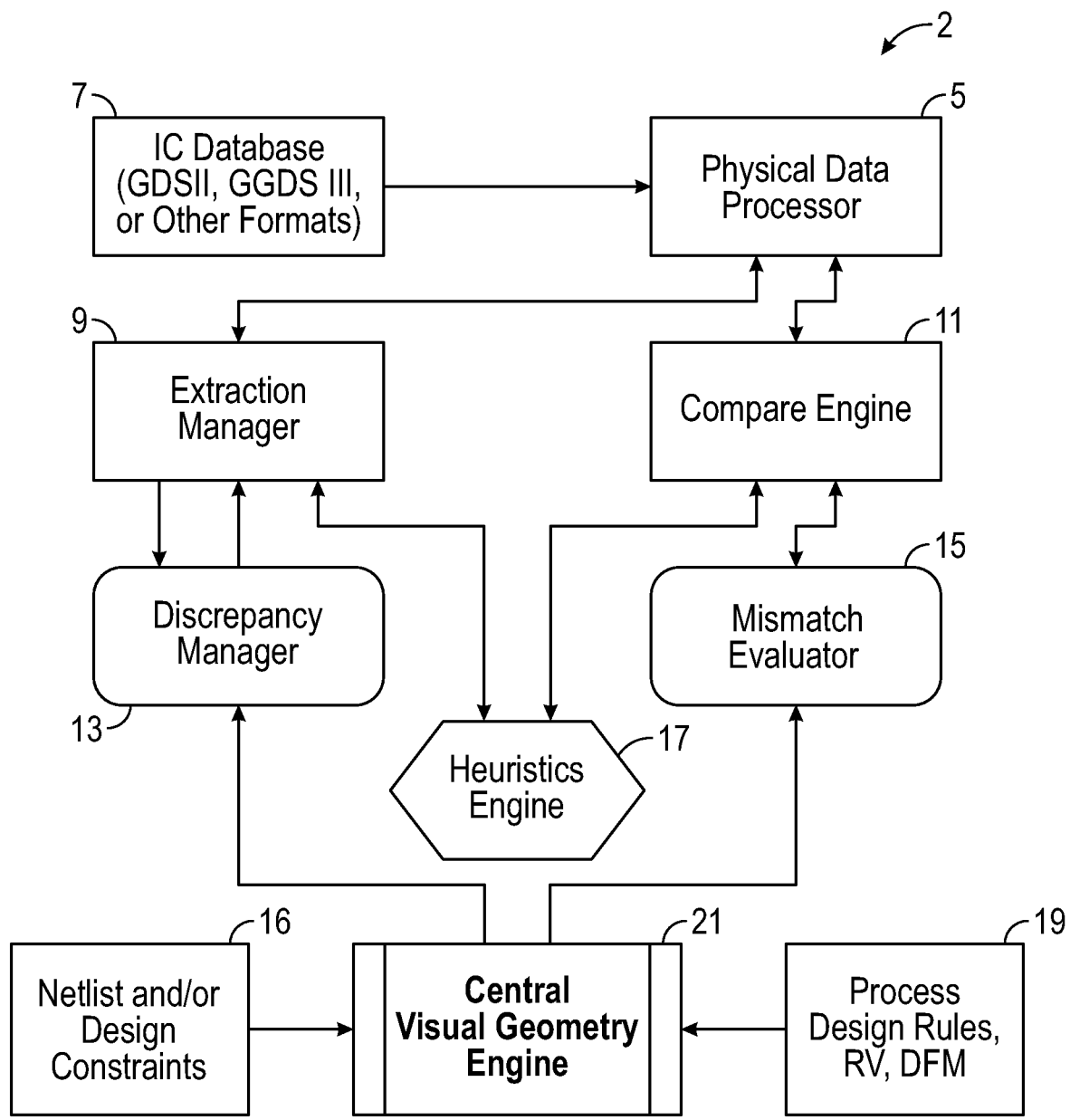
FIG. 1C is a flow chart of an exemplary system of eliminating connectivity mismatches in a mask layout block in accordance with the present disclosure.

Exemplary methods 1 are illustrated in FIGS. 1A and 1B, and an exemplary system 2 is shown in FIG. 1C. A computer system 2 for correcting connectivity mismatches may include a data processor 5, an IC layout database 7, and an extraction manager 9 to extract a layout netlist from geometric layout data. A compare engine 11 may be provided to perform the function of comparing connectivity information in the layout netlist with that of a selected polygon in the mask layout block, as discussed in more detail below.

Discrepancy manager 13 and mismatch evaluator 15 also perform critical functions related to connectivity mismatch detection and correction. The system 2 may use successive approximation heuristics performed by heuristics engine 17 to significantly shorten the analysis time. An external source 16 such as a netlist or external constraints file provides connectivity information, and the system 2 also obtains process and design rules 19. A visual geometry engine 21 allows the system 2 to provide graphical images of the mask layout block, integrated circuit, and polygons' connectivity mismatches to the user.

The system 2 may include one or more neural networks and may have multiple sets of neural networks. One neural network or set of neural networks may be trained with the connectivity information in the external constraints file. Another neural network or set of neural networks may be trained with the matched IC layout connectivity information. Machine learning processes analyze, learn, and compare the IC layout connectivity information to the connectivity information in the external constraints file (schematics connectivity information) and, in the event that mismatches are found, prepare a correction dataset of connectivity information.

Figure 2:
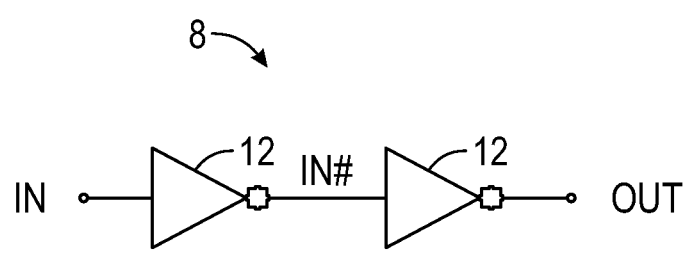
FIG. 2 is a schematic diagram of an exemplary integrated circuit in accordance with the present disclosure.

FIG. 2 shows an exemplary integrated circuit 8 where the schematic diagrammatically represents two inverters connected in serial. As an initial step, a selected polygon 12 or net in the mask layout block 3 is analyzed. More particularly, the system 2 obtains connectivity information 14 associated with the selected polygon 12 or net from an external source 16 such as a netlist or external constraints file. The analysis includes comparing the connectivity of the selected polygon 12 against the connectivity information 14 associated with it. A mismatched net is a layout connection that does not match the netlist or external constraints file. A net or multiple nets can be constructed in the mask layout block using polysilicon, metal, contact, VIA, or any other process-related given layers.

Figure 3:
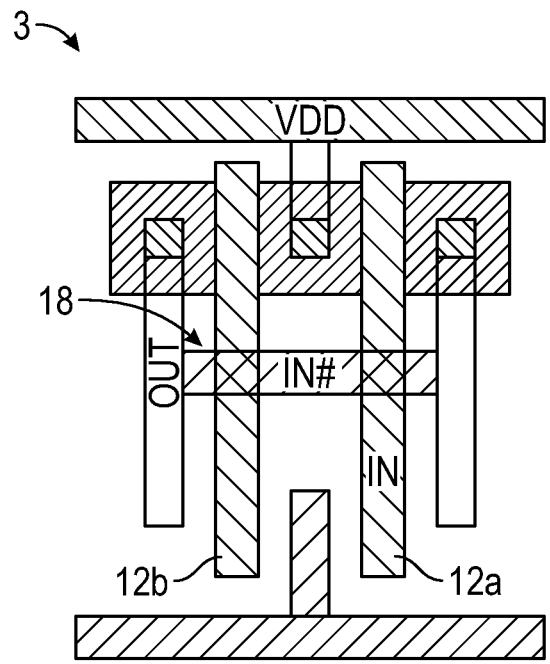
FIG. 3 is a layout view of an exemplary mask layout block showing a connectivity mismatch in accordance with the present disclosure.

If, from this analysis, the system 2 determines that there is a connectivity mismatch 18, the mismatch is automatically corrected. An example of a connectivity mismatch 18 is shown in FIG. 3, where the output of the polygon 12a (here, a first inverter) is supposed to be connected to the input of polygon 12b (a second inverter) but is mistakenly connected to the output of polygon 12b. Thus, the signal IN # is shorted with the signal OUT. The system might also generate a mask layout file from the mask layout block that does not include the connectivity mismatch. Advantageously, analysis of the mask layout block 3 may be performed during its construction to preemptively eliminate connectivity mismatches 18.

Exemplary systems 2 and methods 1 automatically correct the connectivity mismatch 18 by placing, moving, and/or editing the selected polygon 12 or net. A mismatch may be corrected by disconnecting the wrong physical connection 20 and/or by erasing the entire net connections. The correct layout nodes are located in the mask layout database, that are matched according to a schematic netlist or external constraints file 16, and a new connection 20 is created between matched layout nodes. Corrections could also be done by automatically adjusting the number and/or positions of contacts or VIAs until the connectivity mismatch is eliminated. Other possible corrective measures include automatically adjusting the position, width, and/or length of the selected polygon 12 (or partial width and/or length) or automatically placing the polygon 12 or net in an original position in the mask layout block 3 until the connectivity mismatch 18 is eliminated. In exemplary embodiments, the system offers an Undo feature to undo the correction if it should become necessary to do so.

Figure 4:
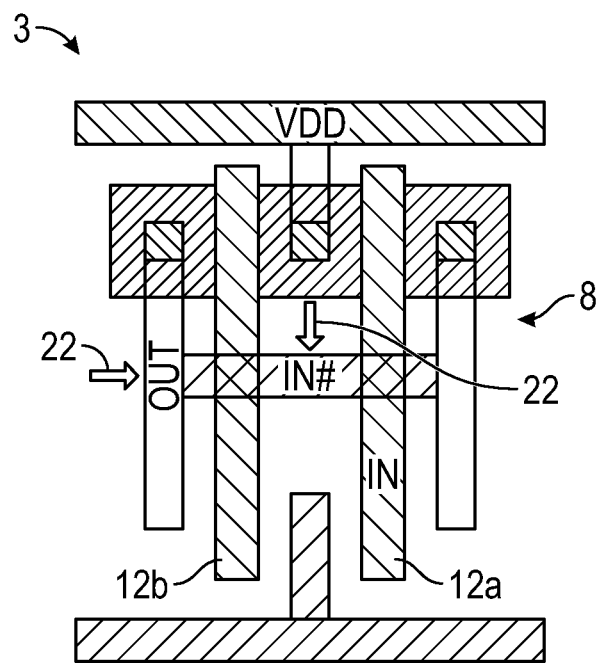
FIG. 4 is a layout view of an exemplary mask layout block showing a connectivity mismatch being corrected by an exemplary system and method of eliminating connectivity mismatches in accordance with the present disclosure.

As best seen in FIG. 4, in exemplary embodiments, when a connectivity mismatch 18 is identified, one or more violation markers 22 are generated. This figure shows a layout view of the integrated circuit 8 after the connectivity mismatch analysis and violation markers 22 graphically representing a connectivity mismatch 18 in the mask layout block where the selected polygon 12 or net does not comply with the netlist and/or external constraints file. A fly-line marker 24 also may be generated. Fly-line markers 24 are associated with the selected position for the polygon 12 or net and graphically represent the correct connectivity between the nodes and the correct nodes to be connected in the mask layout block 3 where the selected polygon or net complies with the netlist and/or external constraints file 16.

Figure 5:
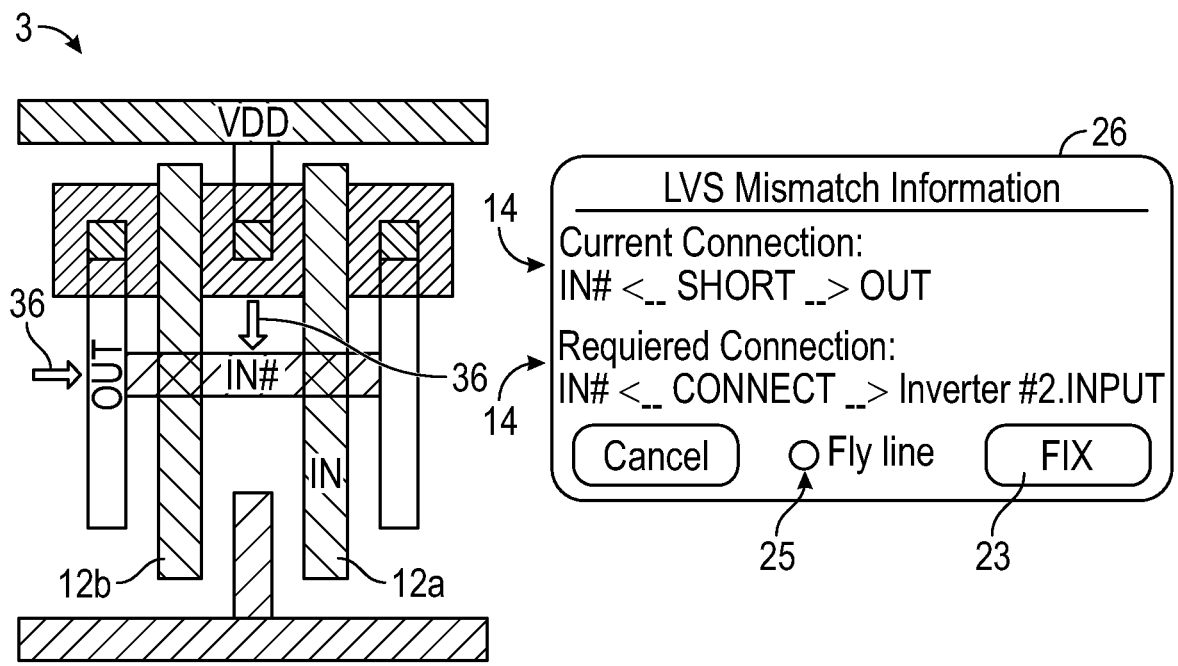
FIG. 5 is a layout view of an exemplary mask layout block and information window showing a connectivity mismatch being corrected by an exemplary system and method of eliminating connectivity mismatches in accordance with the present disclosure.

Referring to FIG. 5, exemplary embodiments have an information window 26 to provide the user with information about the mask layout block 3, the polygons' connectivity, and the correction process. This figure illustrates the user's option to automatically correct the integrated circuit mask layout database under commercial layout editor's environment by clicking on the FIX button 23 located within the information window 26. The information window 26 shows all current mismatch connections and required connections, including displaying the current and required polygon's or net's connectivity parameters.

Figure 6:
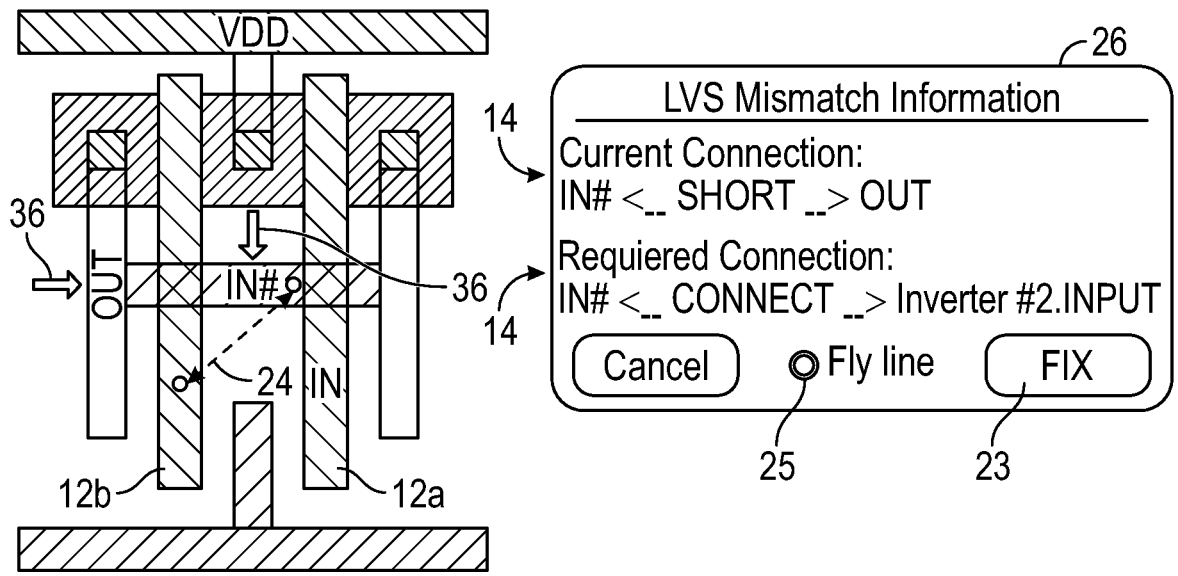
FIG. 6 is a layout view of an exemplary mask layout block and information window showing a connectivity mismatch being corrected by an exemplary system and method of eliminating connectivity mismatches in accordance with the present disclosure.
Figure 7:
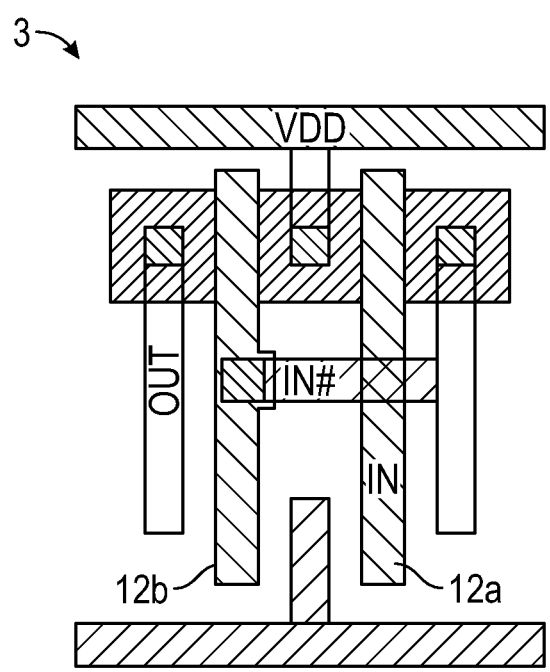
FIG. 7 is a layout view of an exemplary mask layout block after a connectivity mismatch has been corrected by an exemplary system and method of eliminating connectivity mismatches in accordance with the present disclosure.

Advice markers 36 generated by the system 2 may be displayed in the information window 26. In addition, as best seen in FIG. 6, the window 26 shows the option of having the system 2 generate fly-line markers 24. A fly-line radio button 25 may be provided in the information window 26 and, when pressed, it shows the fly-line 24. The window 26 also may provide the option to automatically correct the physical layout within an IC layout database or a commercial layout editor environment. Upon clicking on the FIX button 23 in the information window 26, the system 2 will correct the connectivity mismatches according to the corresponding netlist and/or external constraints file, maintaining design rules dimensions according to a commercial layout editor's technology file. FIG. 7 shows a sample physical layout after the connectivity mismatch has been corrected. More particularly, the signal IN # which is the OUTPUT of polygon or net 12a (first inverter) is now connected to the INPUT of polygon or net 12b (second inverter).

Figure 8:
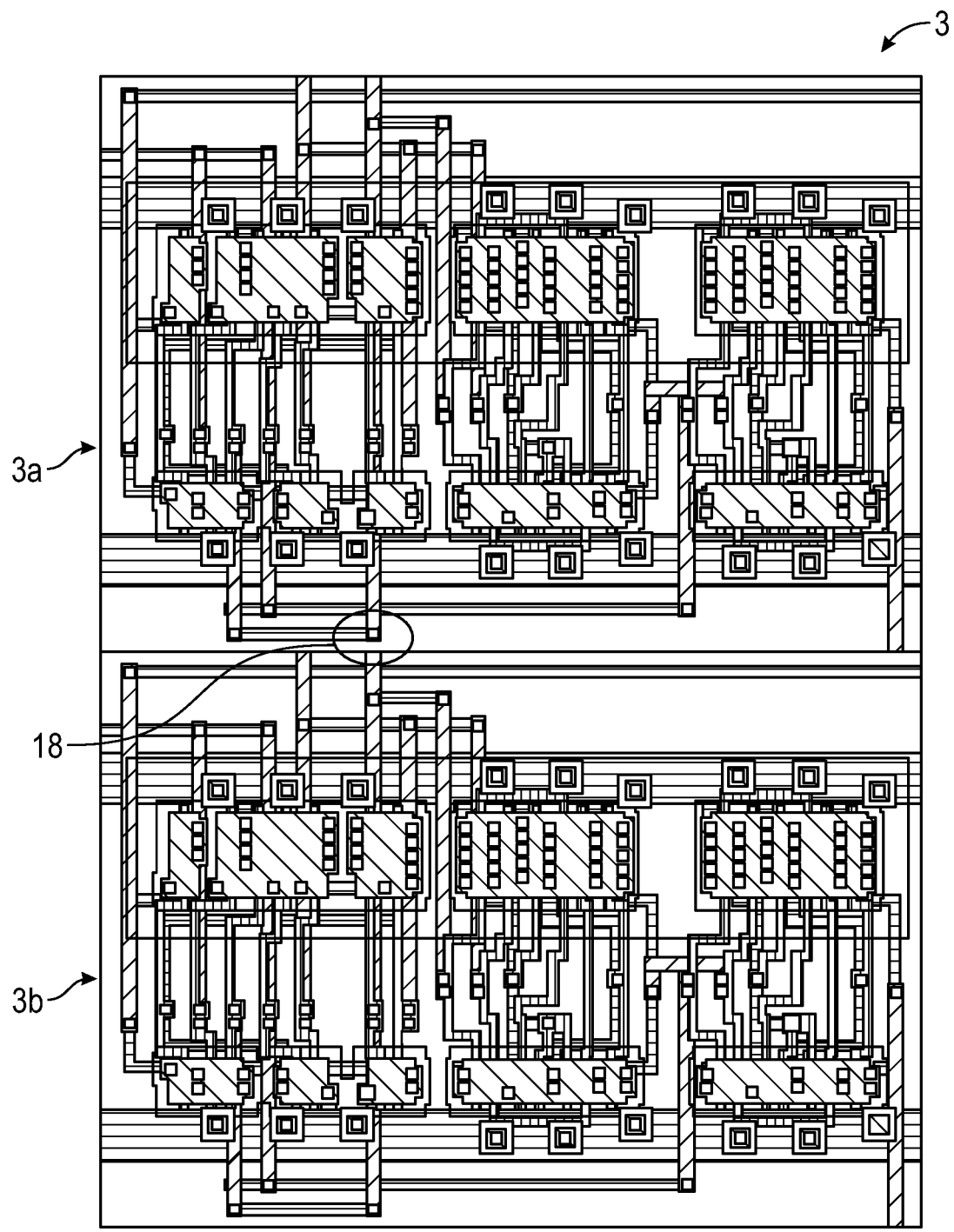
FIG. 8 is a schematic of exemplary hierarchically connected mask layout blocks in accordance with the present disclosure.

In exemplary embodiments, the mask layout block 3 and the netlist and/or external constraints file 16 are hierarchical. Thus, as shown in FIG. 8, the mask layout block 3 may include at least one top-level cell 3a and one or more instances of a sub-cell 3b. The system 2 determines if the selected polygon 12 produces a connectivity mismatch in one or more instances of a sub-cell 3b in the mask layout block. Simultaneously, the system 2 may prevent the layout designer from creating or placing the polygon 12 or net in the mask layout block 3 at the selected position based on the mismatch 18 violation marker 22 in each instance of the sub-cell 27 if a connectivity mismatch 18 exists.

Figure 9:
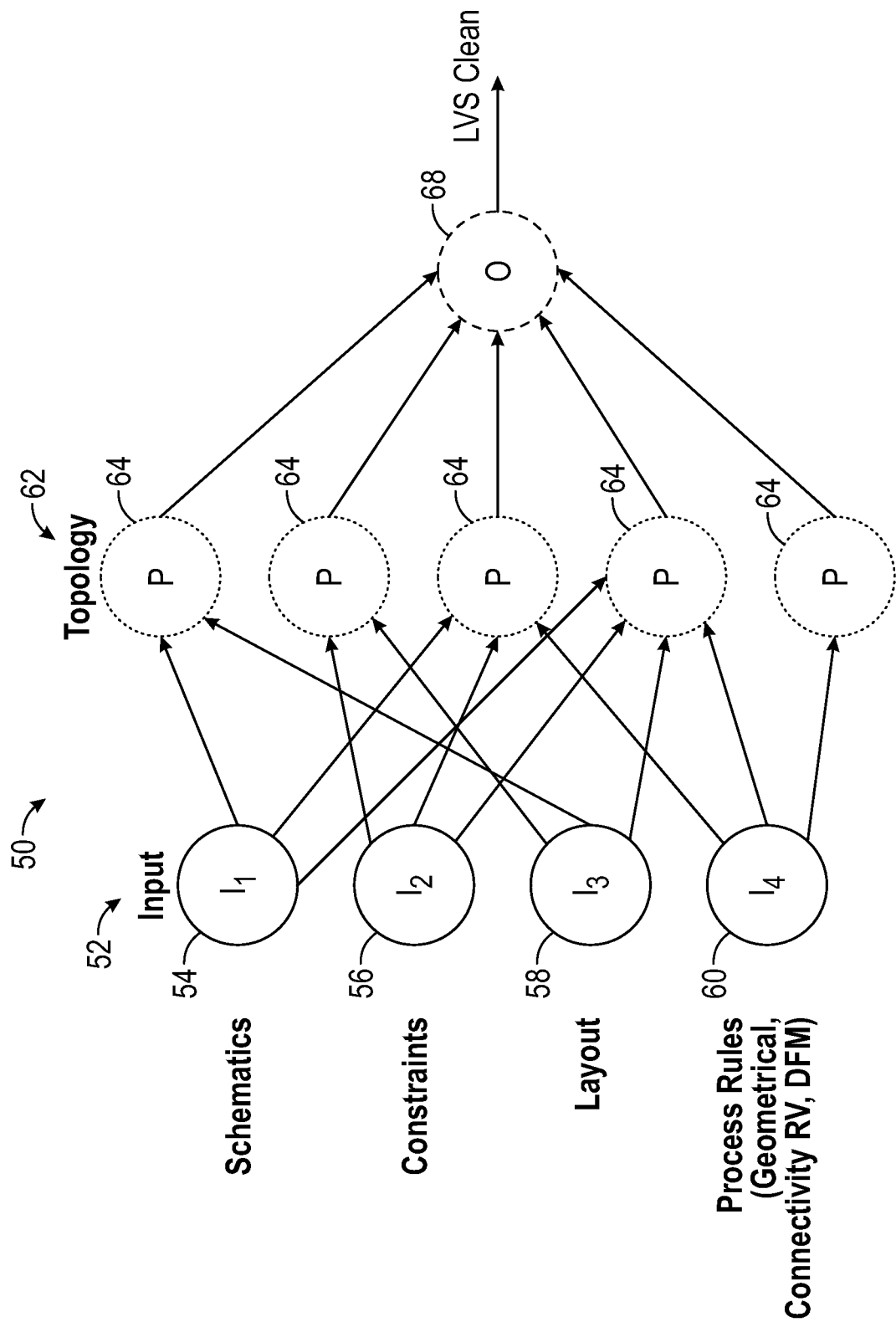
FIG. 9 is a diagram of an exemplary convolutional neural network in accordance with the present disclosure.
Figure 10:
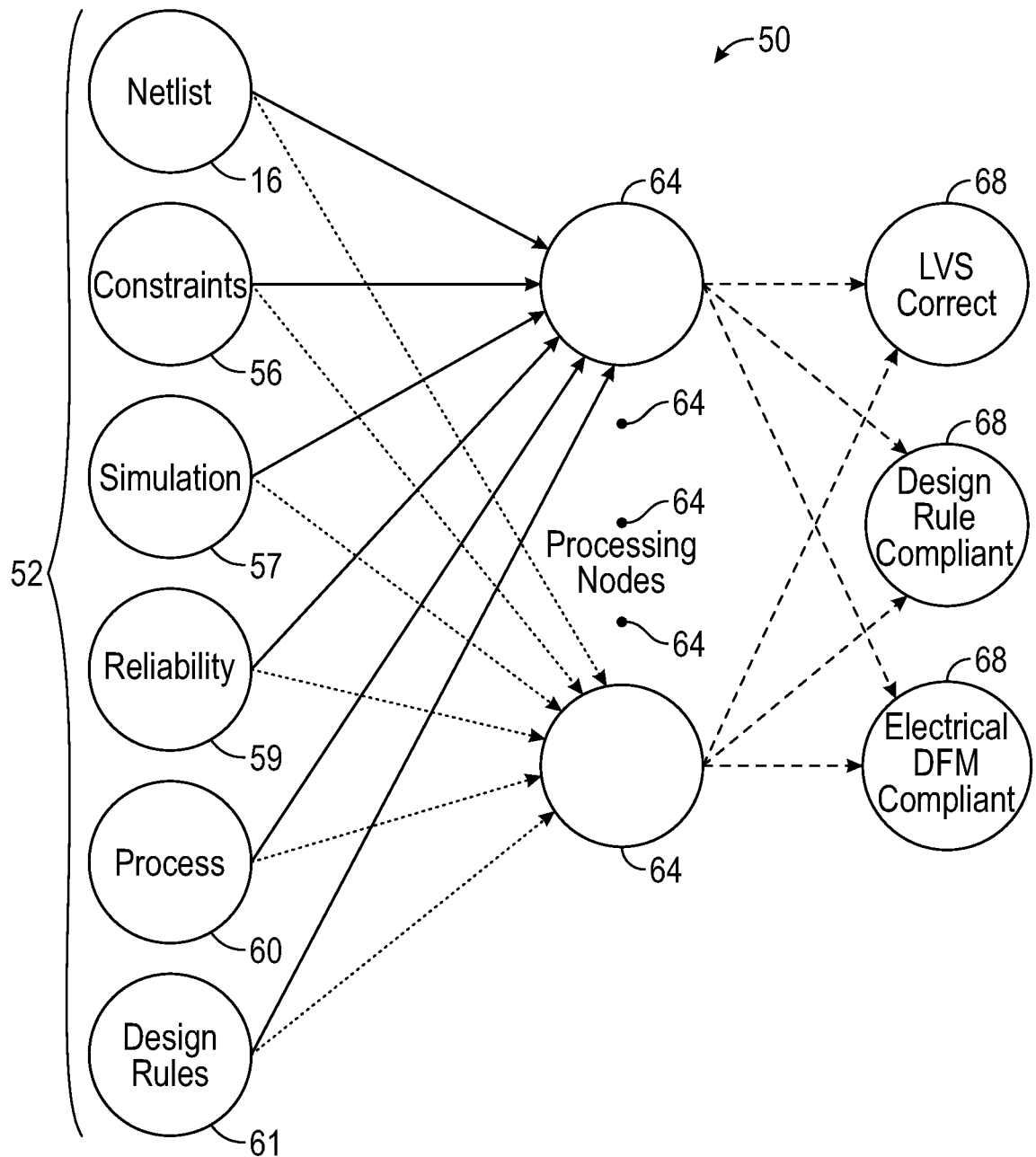
FIG. 10 is a diagram of an exemplary convolutional neural network in accordance with the present disclosure.

The systems and methods described herein may use artificial intelligence technology in the form of convolutional neural networks (CNN) for deep learning of the IC layout structure, analysis, and automatic correction. A convolutional neural network 50 provides the analysis in conjunction with geometrical correction methods. FIGS. 9 and 10 are CNN diagrams illustrating exemplary learning processes showing inputs 52 to the CNN 50 such as a netlist 16, schematics 54, constraints 56, a simulation 57, layout 58, reliability 59, process rules 60, and/or design rules 61. The CNN machine learning topology 62 may be comprised of a plurality of processing nodes 64 that analyze the inputted data. The resulting output 66 is LVS clean 68 (layout connectivity), LVS Correct, design rule compliant, and electrical DFM compliant, specifically an LVS clean mask layout database.

As mentioned above, correction dataset information may be produced by machine learning. Exemplary embodiments have an expert system 90 that uses this information, or correction map, to automatically correct the IC layout to match the schematics. This may include disconnecting nodes in the mask layout block and re-connecting them to match the schematics. It might also comprise removing devices or adding devices that are missing or not included. Advantageously, the expert system 90 calculates and presents various correction possibilities, weighing them according to shortest routing and best electrical characteristics, offering the user the option to select one of the correction possibilities to best match the design. In exemplary embodiments, the expert system 90 offers an interactive correction feature and/or a batch correction mode. When it has completed its corrections, the expert system may produce a report log of the corrections done.

Figure 11:
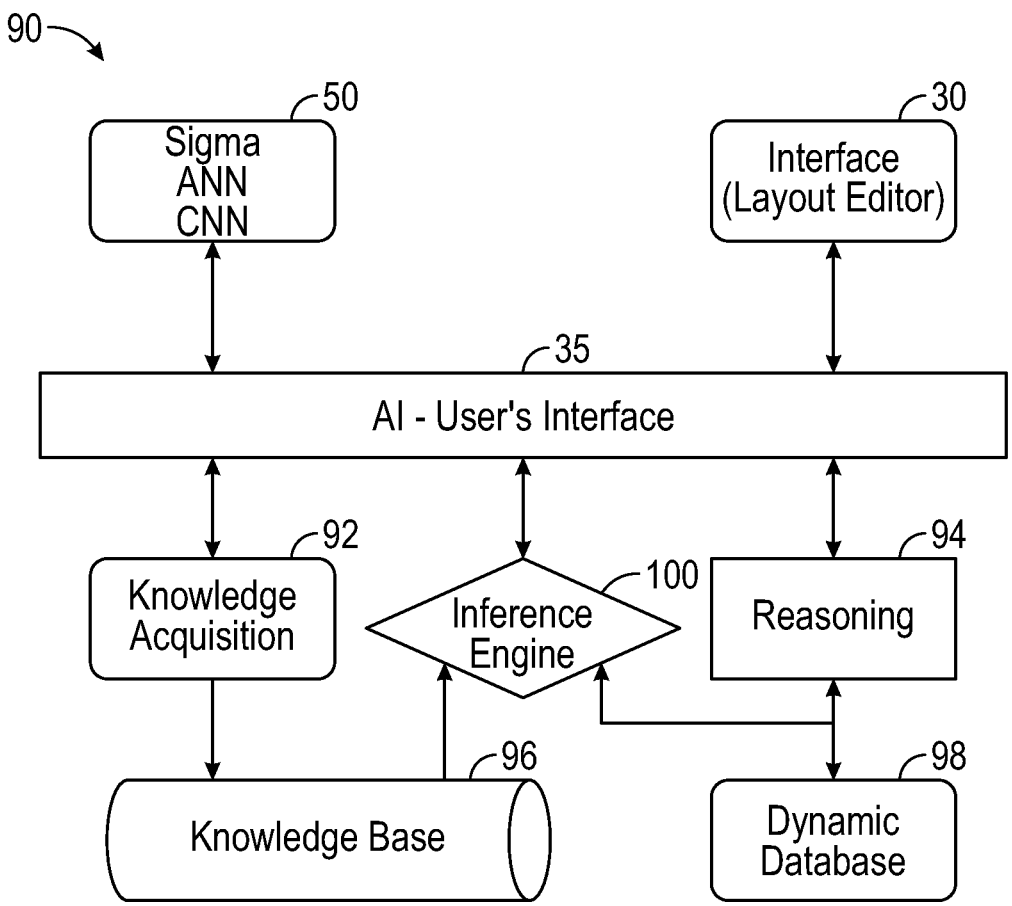
FIG. 11 is a flow chart of an exemplary expert system in accordance with the present disclosure.

An exemplary expert system 90 is illustrated in FIG. 11. CNN 50 and layout editor interfaced tool 30 are communicatively coupled with the AI unit 35, which allows the user to interface with the system 2 by evaluating LVS correction possibilities offered by the CNN 50 and/or an artificial neural network (ANN). Expert system 90 engages in knowledge acquisition 92 including correction dataset information and any other data comprising the requisite knowledge base 96. The knowledge base 96 and a dynamic database 98 provide data to an inference engine 100. The dynamic database also informs the expert system's reasoning 94 to perform the necessary correction steps.

Figure 12:
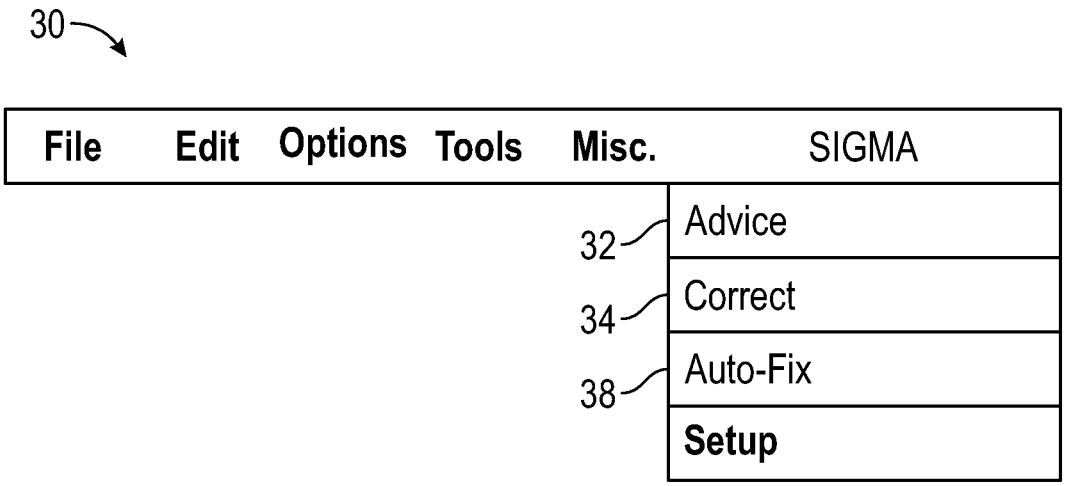
FIG. 12 is front view of a layout editor interfaced tool implementing exemplary systems and methods of eliminating connectivity mismatches in accordance with the present disclosure.

Turning to FIG. 12, in exemplary embodiments the processing instructions include a commercially available layout editor interfaced tool 30. As discussed in detail herein, the tool 30 offers Advice 32, Correct 34, and Auto-Fix 38 modes. The tool 30 analyzes the integrated circuit mask layout database for electrical connectivity and determines if a connectivity mismatch has been made. The tool 30 may be operated independently on a GDS II, GDS III (Oasis) or other formats or within a commercial layout editor environment in two different modes: an Advice mode 32 and a Correct mode 34. Both modes can operate in flat mode and hierarchical mode. When a layout designer chooses to work in hierarchical mode, the tool 30 will graphically provide advice about connectivity mismatches 18 throughout the hierarchy in Advice mode 32. The tool will enforce connectivity mismatch elimination throughout the hierarchy in Correct mode 34. More particularly, in CORRECT mode 34 all edited, placed or created polygons 12 or nets are automatically made connectivity correct.

When operating in Advice mode 32, the tool 30 may graphically display a graphical representation marker called an Advice marker 36 showing connectivity information (and/or connectivity mismatch, in which case it is like the violation marker 22 described above, and/or required correct connectivity) of the selected polygon 12 or net according to a corresponding netlist and/or external constraints file 16. In addition, the tool 30 has the capability to show a fly-line 24, which connects the correct layout nodes. No automatic correction is performed in this mode. In Correct mode 34, the tool may prevent or adjust the creation, placement, or editing of polygons 12 or nets to eliminate or correct connectivity mismatches. User actions are automatically corrected by the system to eliminate connectivity mismatches, while maintaining the process design rules (DRC Clean), layout connectivity (LVS Clean) correctness, and obeying RV and DFM constraints. This is an interactive mode. In the independent mode, the tool 30 will process an IC layout database file of GDS II, GDS III (Oasis) or other format and automatically correct all found connectivity mismatches 18. The user may check both options (Advice and Correct modes) to activate the two modes at the same time. If neither mode is checked, the system is disconnected from the layout editor.

In the interactive mode, when a layout designer creates a mask layout block 3, the tool 30 reads a corresponding netlist and/or external constraints file 16. In addition, the tool 30 reads the process technology file from the commercial layout editor environment. The technology file may contain design rules for the desired manufacturing process that ensure an integrated circuit fabricated on a semiconductor wafer functions correctly. The netlist file includes all connectivity information for the mask layout block 3.

In exemplary embodiments, the tool 30 has an option to read another constraints file which contains additional connectivity information. The tool 30 may compare logical connections contained in a netlist or external constraints file 16 generated from a schematic diagram of an integrated circuit with electrical connections contained in a mask layout database within a commercial layout editor, generated from the corresponding layout block for the integrated circuit. If the electrical connections in the mask layout file match the logical connections in the netlist, the tool 30 may generate a graphical representation object that indicates the mask layout database does not include any connectivity mismatches.

However, if at least one electrical connection in the mask layout database within the commercial layout editor does not match the corresponding logical connection in the netlist, the tool 30 may generate an Advice marker 36 that contains connectivity mismatch information identified by the tool in the mask layout database within the commercial layout editor environment. The Advice marker 36 is then used to locate the electrical connections in the mask layout block 3 under the commercial layout editor that do not match the corresponding logical connections in the netlist or external constraints file 16.

In exemplary embodiments, the tool 30 automatically deletes the mismatched connections. The tool 30 may remove all the polygons 12 associated with the mismatched connection and create new connections in order to correct the mismatch 18. The tool 30 may match the nodes in the mask layout database within a commercial layout editor environment to the nodes in the netlist and generate electrical connections that match the logical connections. The tool 30 then automatically routes the electrical connections among the appropriate nodes. The electrical connections are routed though the mask layout database within the commercial layout editor, using the editor's commands and functions, without creating any design rule violations in the mask layout block 3. The process is performed on all mismatched connections 18 until all the connectivity mismatches are removed from the mask layout block. The tool then uses the connectivity information provided by the corresponding netlist or external constraints file to prevent the layout designer from creating connectivity mismatches during the construction of the mask layout block 3.

If the layout designer chooses to operate in Advice mode 32, the layout designer may select a polygon 12 or net by moving a cursor over the desired polygon/net and/or selecting it. The tool 30 uses the connectivity information to graphically display the correct connection through an Advice marker 36 and/or fly line 24, within the mask layout block 3 where the layout designer may move, place, create or edit a polygon 12 or a net. If the layout designer selects, creates, edits, or moves polygons 12 or nets the tool 30 may graphically guide for the correct location and connection of the polygon 12 or net in order to comply with the corresponding netlist and/or external constraints file 16.

The tool 30 may graphically represent the Advice marker 36 in the mask layout block 3 by highlighting the correct node(s) to be connected with an appropriate color and/or pattern. The Advice marker color and/or pattern can be set in an initial tool setup. In addition, the tool may show an information window 26 with the current and required conditions. The information window 26 also provides the user with the option to correct the violation.

If the layout designer chooses to operate in Correct mode 34, the tool 30 may prevent the layout designer from creating, placing, editing, and connecting a polygon 12 or a net in a position within the mask layout block 3 that will cause a connectivity mismatch 18. If the layout designer attempts to create a polygon 12 or net of a certain width, length or in a location that does not comply with the netlist and/or external constraints file 16 requirements and causes a connectivity mismatch 18, the tool 30 automatically adjusts the polygon or net to the correct width/length or size or by changing its location.

In exemplary embodiments, if the layout designer is stretching a metal polygon's edge in order to connect between two nodes, the tool 30 automatically stretches the edge to the required length to connect it to the matched node. If the nodes are not to be connected according to the netlist file, then the tool will not allow them to be connected. If the mask designer attempts to connect these nodes, the metal wire will not be connected but will return to its original position or location with a system warning about LVS mismatch. In exemplary embodiments, if the layout designer is placing a VIA on a connection area between Metal 3 and Metal 4 polygons to mistakenly connect two nodes electrically, the tool 30 will automatically remove the VIA with an Advice marker notice about an LVS mismatch.

The tool 30 may include another mode called Auto-Fix mode 38. In this mode, the entire layout block goes through a check and fix process. Auto-Fix mode 38 is aimed to be activated with the completion of the entire layout block 3. Using this feature the entire block will be analyzed for connectivity mismatches 18. When analysis is complete all mismatches 18 will be shown using an Advice marker 36. This mode can operate in flat or fully hierarchical mode.

Auto-Fix mode 38 also can provide an Auto-Correction feature 40. After complete analysis of the mask layout block 3 the user has the option to approve an Auto-Correction action. Upon activation of this feature all connectivity mismatches will be automatically fixed, while maintaining the process design rules (DRC Clean), layout connectivity (LVS Clean) correctness, and obeying RV and DFM constraints. For example, after completion of an integrated circuit layout block under commercial layout editor environment, the user has the option to run the Auto-Fix feature 38. The tool 30 will run a complete LVS analysis, or read external tool LVS results data, identifying all connectivity mismatches 18, if any exist, then the tool 30 will automatically correct all connectivity mismatches. The tool may CUT, MOVE, CREATE, ERASE, STRETCH or perform any other IC layout modifications to correct all connectivity mismatches 18, independently on an IC layout database file (GDSII, GDS III (Oasis), or other formats) or within a commercial layout editor environment.

The processing instructions for automatic connectivity mismatches elimination within an integrated circuit layout block database in an IC layout data file (GDSII, GDS III (Oasis) or any other format) may be encoded in computer-usable media. Such computer-usable media may include, without limitation, storage media such as floppy disks, hard disks, CD-ROMS, DVDs, read-only memory, and random access memory, as well as communications media such wires, optical fibers, microwaves, radio waves, and other electromagnetic or optical carriers.

In operation, exemplary process flows (shown in FIGS. 1A and 1B) start by reading 1010 and comparing a physical connection in a mask layout block 3 to a corresponding connection in a schematic netlist and/or external constraints file 16, which contains the net's connectivity parameters and other integrated circuit related connectivity factors. The schematics 54 may include information on circuit/layout topology 70 and design constraints 56. This step includes analyzing 1030 a selected polygon 12 or net, including its position, for connectivity, obtaining 1020 relevant connectivity information from the netlist or external constraints file 16, and comparing the selected polygon 12 to the netlist connectivity information that is associated with the polygon or net, i.e., comparing 72 the schematics 54 to the layout 70. In exemplary embodiments, the selected position for the polygon 12 or net comprises a location for the polygon in the mask layout block 3. The analysis may be done during or after construction of the mask layout block 3.

The system queries 74 whether there is a match between the schematics and the layout. In the event of a match, a second-pass check and optimization may be performed 76. If a mismatch 18 is identified 1040 the connectivity error is graphically presented 1060 in the mask layout database 3. More particularly, if the analysis reveals a connectivity mismatch 18, a violation marker 22 associated with the selected position, length, or width of the selected polygon 12 or net may be generated. The violation marker 26 provides a graphical representation of the connectivity mismatch 18 and may show where the selected polygon 12 or net complies with the external constraints file 16. A fly line 24 connected among the correct layout nodes also may be generated. Both the violation marker 22 and fly line 24 may be displayed in an information window 26, along with the current and required polygon or net's connectivity parameters, so the user may easily see them. The process may include automatically preventing a layout designer from creating, placing, or editing the polygon or net 12 in the mask layout block 3 at the selected position based on the violation marker if a connectivity mismatch exists.

The user is given the option to have the connectivity mismatch 18 automatically corrected 1080 by placing, moving, or editing the selected polygon 12 or net and/or modifying the connection. The placing step may constitute automatically placing the polygon or net 12 in an original position in the mask layout block 3. The editing step may comprise adjusting the polygon's width and/or length or parts thereof, and/or number of contacts or VIAs until the connectivity matches the associated netlist or external constraints file 16. Exemplary processes also include automatically determining if the modified connection creates a process design rule violation and automatically eliminating the design rule violation by further modifying the modified connection within commercial layout editor. After the correction process is completed, the system may once again query 74 whether there is a match between the schematics and the layout. When the system has determined that the correction process has successfully made a match, it may conduct a performance evaluation 78 of the post-correction layout. Then, if the design specs are met 80, the correction is approved 82. Some or all of the method steps may be aided or run by an artificial intelligence (AI) unit 35, particularly the correction 1080, second-pass optimization check 76, and the post-correction layout performance evaluation 78.

The user has the option to perform a comprehensive Detect-and-Auto-Correct of all LVS mismatches of the entire IC layout block. The method and system also provides an option to automatically correct the connectivity mismatch during the construction of the mask layout block within commercial layout editor using the editor's commands and functions. After correcting all connectivity mismatches 18, a clean write log file may be generated 1090. The tool works on a standard IC layout database of GDSII, GDS III (Oasis) or any other general format.

Thus, it is seen that systems and methods of automatically eliminating connectivity mismatches in a mask layout block are provided. It should be understood that any of the foregoing configurations and specialized components or connections may be interchangeably used with any of the systems and/or methods of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the present disclosure.

What is claimed is:

1. A computer-implemented method of automatically eliminating connectivity mismatches in a mask layout block, comprising:
   analyzing a physical connection of a selected polygon or net in a mask layout block;
   obtaining connectivity information associated with the selected polygon or net from an external source;
   training a first neural network with the connectivity information from the external source and training a second neural network with the physical connection in the mask layout block;
   comparing the physical connection of the selected polygon or net with the obtained connectivity information to determine whether there is a connectivity mismatch associated with the selected polygon or net;
   if there is a determined connectivity mismatch, generating a violation marker representing the connectivity mismatch; and
   correcting the connectivity mismatch by placing, moving, or editing the selected polygon or net to modify the physical connection.

2. The computer-implemented method of claim 1 wherein the external source is a netlist or external constraints file.

3. The computer-implemented method of claim 1 wherein the analyzing step is performed during construction of the mask layout block.

4. The computer-implemented method of claim 1 further comprising generating a layout connectivity clean mask layout database during construction of the mask layout block.

5. The computer-implemented method of claim 1 further comprising determining if the modified physical connection creates a process design rule violation; and
   if a process design rule violation is created, eliminating the process design rule violation by further modifying the modified physical connection.

6. The computer-implemented method of claim 1 further comprising providing an information window showing the connectivity information.

7. The computer-implemented method of claim 1 wherein the step of correcting the connectivity mismatch further comprises:
   disconnecting the physical connection by erasing all net connections;
   locating correct layout nodes in the mask layout block; and
   creating a new physical connection between matched layout nodes.

8. The computer-implemented method of claim 1 further comprising generating a fly-line marker representing a corrected position for the selected polygon or net.

9. The computer-implemented method of claim 1 wherein the mask layout block includes at least one top-level cell and at least one sub-cell located in the top-level cell, and further comprising:
   determining if there is a connectivity mismatch in the at least one sub-cell.

10. The computer-implemented method of claim 1 wherein, if there is a determined connectivity mismatch, further comprising preparing a correction dataset based on the determined connectivity mismatch.

11. The computer-implemented method of claim 1 further comprising undoing a correction to the connectivity mismatch.

12. A computer-implemented system for automatic elimination of connectivity mismatches in a mask layout block, comprising:
   a processor;
   a computer readable memory in communication with the processor, the computer readable memory containing processing instructions;
   the processing instructions providing for analysis of a physical connection of a selected polygon or net in a mask layout block and for retrieval of connectivity information associated with the selected polygon or net from an external source;
   the processing instructions providing for comparison of the physical connection of the selected polygon or net with the retrieved connectivity information to determine whether there is a connectivity mismatch associated with the selected polygon or net;
   if there is a determined connectivity mismatch, the processing instructions providing for generation of a violation marker representing the connectivity mismatch and for correction of the connectivity mismatch by placing, moving, or editing the selected polygon or net to modify the physical connection; and
   further comprising a first one or more neural networks trained with the connectivity information from the external source and a second one or more neural networks trained with physical connection in the mask layout block.

13. The computer-implemented system of claim 12 wherein if there is a determined connectivity mismatch, the processing instructions prevent placement of the selected polygon or net in the mask layout block at a position that would create the connectivity mismatch.

14. The computer-implemented system of claim 12 further comprising an information window in communication with the computer readable memory and the processor;
   wherein the connectivity information and the violation marker are visible in the information window; and
   wherein a fly-line marker representing a corrected position for the selected polygon or net is visible in the information window.

15. The computer-implemented system of claim 12 further comprising an expert system configured to automatically correct connectivity mismatches.

16. The computer-implemented system of claim 12 wherein the mask layout block includes at least one top-level cell and at least one sub-cell, and the processing instructions provide for determination whether there is a connectivity mismatch in the at least one sub-cell.

17. A method for automatic elimination of connectivity mismatches in a mask layout block, comprising:
   analyzing a selected connection of a selected polygon or net in a mask layout block;
   determining if the selected connection of the selected polygon or net produces a connectivity mismatch in the mask layout block based on an external constraints file;
   if there is a determined connectivity mismatch, generating a violation marker representing the connectivity mismatch and presenting correction possibilities, an interactive correction feature, and a batch correction mode to a user via an expert system;
   providing a fly-line between correct layout nodes; and
   correcting the connectivity mismatch via the expert system by placing, moving, or editing the selected polygon or net to modify the physical connection.

18. The method of claim 17 wherein if there is a determined connectivity mismatch, further comprising preventing placement of the selected polygon or net in the mask layout block at a position that would create the connectivity mismatch.

19. The method of claim 17 wherein correcting the connectivity mismatch comprises placing the selected polygon or net in an original position in the mask layout block.

20. The method of claim 17 wherein correcting the connectivity mismatch comprises adjusting one or more of: the length or width of the selected polygon.

21. The method of claim 17 wherein correcting the connectivity mismatch comprises adjusting a number of contacts or VIAs.

* * * * *